(12) United States Patent  (10) Patent No.: US 7,621,162 B2
Bartky  (45) Date of Patent: Nov. 24, 2009

(54) HIERARCHICAL FLOW-CHARACTERIZING MULTIPLEXOR

(75) Inventor: Alan Keith Bartky, Santa Ana, CA (US)

(73) Assignee: Alcatel Lucent, Paris (FR)

( * ) Notice: Subject to any disclaimer, the term of this patent is extended or adjusted under 35 U.S.C. 154(b) by 944 days.

(21) Appl. No.: 10/750,120

(22) Filed: Dec. 30, 2003

(65) Prior Publication Data

US 2005/0141427 A1 Jun. 30, 2005

(51) Int. Cl.
*H04L 12/50* (2006.01)
(52) U.S. Cl. ............... 70/388; 370/395.42; 370/428
(58) Field of Classification Search ......... 370/235–236, 370/256, 388, 395.42, 412–418, 428
See application file for complete search history.

(56) References Cited

U.S. PATENT DOCUMENTS

| | | | | |
|---|---|---|---|---|
| 6,608,816 | B1 * | 8/2003 | Nichols ..................... | 370/235 |
| 6,781,994 | B1 * | 8/2004 | Nogami et al. ............ | 370/395.1 |
| 6,813,250 | B1 * | 11/2004 | Fine et al. .................. | 370/256 |
| 2001/0009552 | A1 * | 7/2001 | Parruck et al. ............ | 370/412 |
| 2002/0107908 | A1 * | 8/2002 | Dharanikota .............. | 709/203 |
| 2002/0176431 | A1 * | 11/2002 | Golla et al. ................ | 370/412 |
| 2002/0181484 | A1 * | 12/2002 | Aimoto ...................... | 370/413 |
| 2003/0026271 | A1 * | 2/2003 | Erb et al. .................... | 370/401 |
| 2003/0152084 | A1 * | 8/2003 | Lee et al. ................... | 370/395.21 |
| 2003/0174706 | A1 * | 9/2003 | Shankar et al. ............ | 370/393 |
| 2003/0225907 | A1 * | 12/2003 | Krishnan .................... | 709/238 |
| 2003/0231593 | A1 * | 12/2003 | Bauman et al. ............ | 370/235 |
| 2005/0008020 | A1 * | 1/2005 | Ashwood-Smith et al. ....... | 370/395.1 |
| 2005/0135399 | A1 * | 6/2005 | Baden et al. ............... | 370/428 |
| 2005/0147032 | A1 * | 7/2005 | Lyon et al. ................. | 370/229 |
| 2006/0168337 | A1 * | 7/2006 | Stahl et al. ................. | 709/240 |
| 2006/0209840 | A1 * | 9/2006 | Paatela et al. ............. | 370/395.7 |
| 2006/0291495 | A1 * | 12/2006 | Lin ............................. | 370/412 |

* cited by examiner

*Primary Examiner*—Ricky Ngo
*Assistant Examiner*—Phuongchau B Nguyen
(74) *Attorney, Agent, or Firm*—RG & Associates LLC

(57) ABSTRACT

A method of multiplexing a plurality of data flows into a single output using hierarchical gating operations instead of queues is disclosed. In the preferred embodiment, the hierarchical multiplexing method comprises sequentially processing a packet at each of a plurality of hierarchical levels by characterizing the flow at each hierarchical level and either passing or discarding the packet. The decision whether to pass or discard a packet is generally made for each packet at one or more hierarchical levels based on traffic parameters and the state of the system such as congestion. In the preferred embodiment, a Three Color Marker algorithm is used to characterize the flow and mark packets subjecting to the discard decision. The invention may be used by a router or multi-layer switch to process multiple data flows in a hierarchical fashion without hierarchical queues, thereby reducing processing and memory requirements.

21 Claims, 5 Drawing Sheets

HIERARCHICAL FLOW-CHARACTERIZING MULTIPLEXOR

FIELD OF INVENTION

The invention generally relates to a technique for processing data flows in a packet switching device. In particular, the invention relates to a system and method for multiplexing a plurality of data flows into a single output using hierarchical gating operations being preferred over hierarchical queues.

BACKGROUND

Network routers and multi-layer switches generally include a plurality of ports operatively coupled to communications links over which the switch or router exchanges packets with other network nodes. A router or switch is adapted to transmit an inbound packet, received on a port, toward a destination reachable through any of the other ports. Inside the router or switch, the packets destined for an outbound port can be classified into a plurality of traffic flows in order to apply the appropriate processing and quality of service, for example. A priority and/or weighted queue structure and output scheduler are typically employed to coordinate the processing and transmission of these flows in a manner that fairly allocates output bandwidth to the competing flows.

An example hierarchical queue structure 100 illustrated in FIG. 1 includes a plurality of packet buffers or queues organized into three levels of hierarchical data packet flows. At the first level of queues 101-103, each individual queue 104 is associated with a single flow 110 identified by a classified mechanism in the router or switch. The packets of the flows 110 are enqueued by an enqueuing function, temporarily buffered in a queue 104, dequeued by a dequeue function associated with the queue 104, processed in accordance with one or more processing operations 112, and then mapped 114-116 into a second level of queues. Each of the flows 120 at the second level of queues is buffered in an individual queue 105-107 while they await processing associated with the particular level. After being dequeued, the flows at the second level may undergo one or more processing operations 113 before being mapped 118 into a single flow at the third level of queues where the packets are buffered in the "final" queue 108 immediately prior to transmission from the egress port.

In the hierarchical queue structure 100, each individual packet is enqueued and dequeued into and out of multiple queues as it propagates from the first level of queues to the last. At any given enqueue or dequeue point, the queue structure 100 may make a decision to continue to process the packet or discard it. A packet may be discarded prior to being enqueued or after being dequeued where, for example, (a) the queue is full or nearly full; (b) the queue descriptors used to manage packets within the queue are empty or low; (c) the amount of data in a given time has exceeded maximum allotted storage for the flow being enqueued; (d) the time spent in queue exceeds the maximum allowable time; (e) a buffer pool is empty or low; or (f) the data destination line is down or otherwise inoperable.

A queue structure with multiple levels of hierarchical queues has a number of drawbacks. The queue structures require (a) valuable system resources including system memory, (b) additional flow processing needed to make decisions whether to pass or discard a packet, and (c) significant processing time that increases latency, i.e., the time necessary for the packet to propagate through the data communications system. With respect to system memory, queues consume a significant memory to (a) store queue descriptors, (b) support basic queue management for tracking head/tail pointers, the queue itself, and timers; and (c) retain queue state information including links relating hierarchical queues.

With respect to processing resources, queue structures require a significant number of clock cycles to process the enqueue function and dequeue function for each of the plurality of queues. Contributing to the burden imposed on the processing resources, the presence of hierarchical layers of queues in the prior art introduces additional processing inefficiencies. In particular, the processing operations and enqueue/dequeue functions performed on behalf of a packet from the first to last queue level are associated with separate software code executed as separate tasks. For example, the initial task A 160 associated with a packet of flow 101 involves enqueueing the packet in first level queue 104. The processor then goes off to perform some other task. At a later point in time, a second task B 161 checks the queue 104 and dequeues the packets for further processing. As represented by third task C 162 and fourth task D 163, the process of separately enqueuing and dequeueing a packet is repeated for each packet at each level of the hierarchical-based queuing structure. For software based systems, the act of performing consecutive tasks in a non-continuous fashion consumes significant processing time, thereby increasing the latency (i.e., signal delay) through the data communications system and reducing the time available to the CPU to perform other operations. For silicon based systems, these queues take up significant space on the chip and a similar increased latency also applies.

There is therefore a need for a technique to map multiple flows to a single output while reducing the computational and data storage burdens imposed on system resources associated with enqueuing and dequeuing functions.

SUMMARY

The invention in its several embodiments features a method of multiplexing a plurality of data flows into a single output using hierarchical gating operations instead of queues. The data flows generally comprise protocol data units (PDU) identified by a classification mechanism in a network switching device. Upon receipt of a PDU associated with one of a plurality of flows, the hierarchical multiplexing method in one embodiment sequentially processes the PDU at each of a plurality of hierarchical levels with processing that involves the steps of: characterizing the flow at the current hierarchical level, and gating the PDU wherein the PDU is either passed or discarded based upon the character of the flow at each level. If the PDU is passed at each of the hierarchical levels, the PDU is transmitted by the hierarchical flow-characterizing multiplex to the next downstream process, which may be an egress port or switch fabric, for example.

Gating as used herein refers to the application of discard control logic to decide whether to pass or discard a PDU. The decision to discard or not is made for each packet at one or more hierarchical levels as a function of traffic parameters for the level and the state of the system. In the preferred embodiment, the flows are characterized by a Three Color Marker (TCM) algorithm and the PDU passed or discarded by the gating operation depending, in part, on the color associated with the PDU by the TCM algorithm.

The method of the preferred embodiment may be used by a router or multi-layer switch to process multiple data flows in a hierarchical fashion without a plurality of hierarchical queues. Using a TCM algorithm instead of queues in this manner significantly reduces processing and memory requirements in packet or frame based systems while improving latency. For example, a PDU may be processed from input to output in a single computational "task," thereby eliminating the piecemeal processing and the enqueue/dequeue functions associated with approaches commonly employed in the art. In addition, PDU forwarding operations used to prepare a PDU for egress, including addressing and virtual local area network (VLAN) stacking, may seamlessly be integrated into the processing steps performed at one or more hierarchical layers.

BRIEF DESCRIPTION OF THE DRAWINGS

The present invention is illustrated by way of example and not limitation in the figures of the accompanying drawings, and in which.

DETAILED DESCRIPTION OF THE PREFERRED EMBODIMENT

Figure 1:
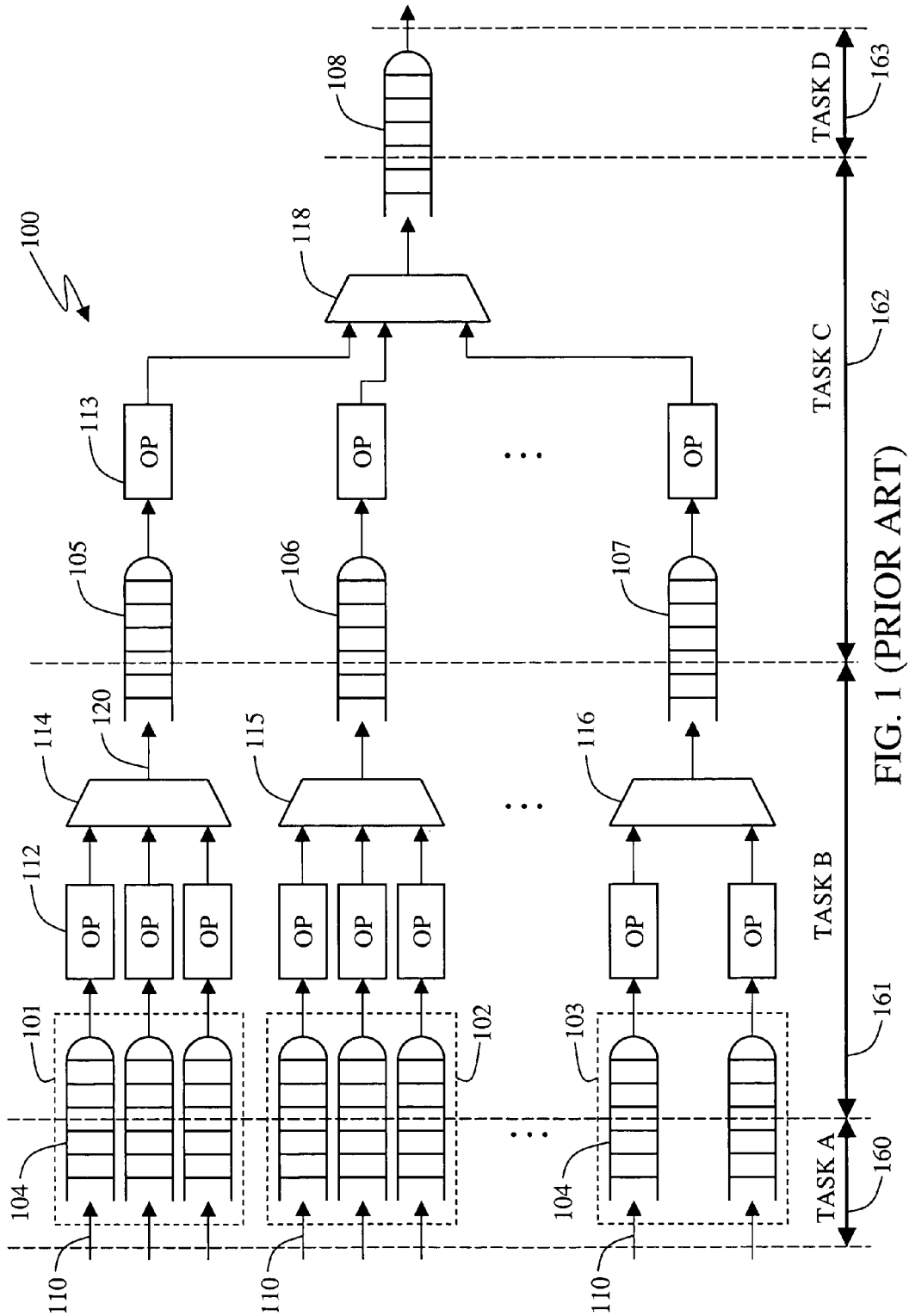
FIG. 1 is a functional block diagram of a prior art queue structure with multiple levels of hierarchical queues.
Figure 2:
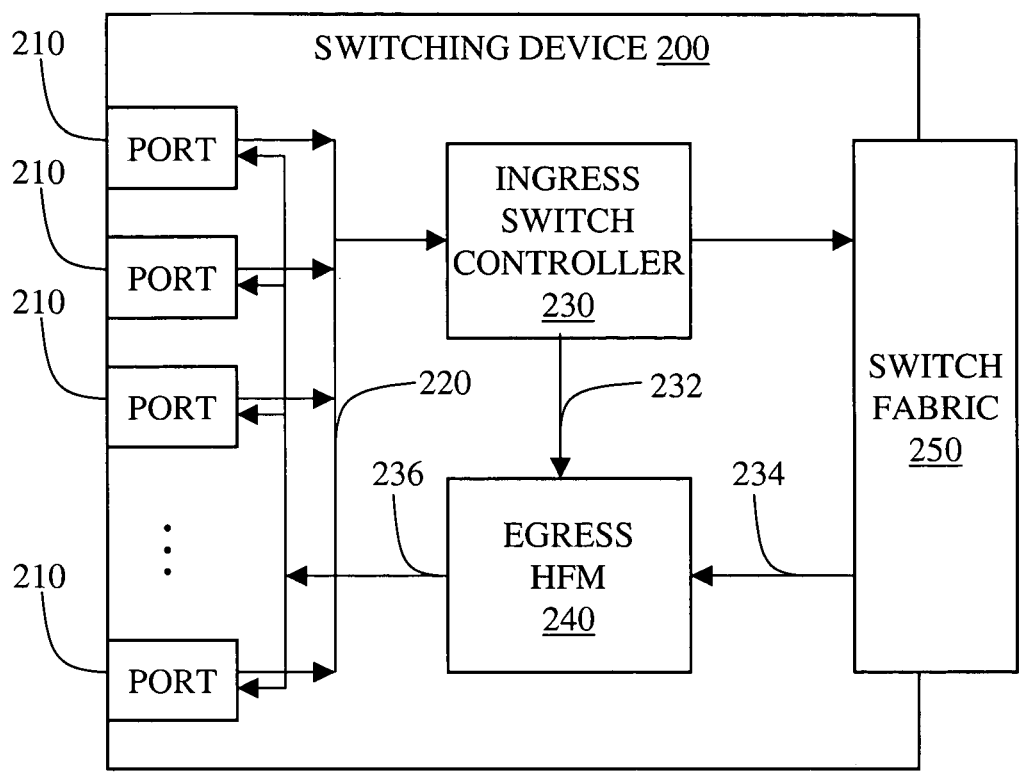
FIG. 2 is a functional block diagram of an example network switching device with which the invention may be implemented, according to the preferred embodiment.

Illustrated in FIG. 2 is a functional block diagram of an example network switching device with which the invention may be implemented. The switching device 200 in the preferred embodiment is adapted to perform switching and routing operations with protocol data units (PDUs) at layer 2 (Data Link Layer) and layer 3 (Network Layer) as defined in the Open Systems Interconnect (OSI) reference model. The switching device 200 is preferably one of a plurality of switching devices operatively coupled to one another via a common switch fabric (not shown). The switching devices are in turn operatively coupled to a plurality of nodes in a communication network embodied in a local area network (LAN), wide area network (WAN), metropolitan area network (MAN), or a combination thereof, for example.

The switching device 200 of the preferred embodiment generally comprises one or more ingress switch controllers 230 and one or more hierarchical flow-characterizing multiplexors (HFM) 240 operatively coupled to the network via a plurality of external ports 210, each external port being operatively coupled to a communications link for purposes of receiving ingress data traffic and transmitting egress data traffic. As used herein, traffic entering the switching device 200 at the ports 210 is referred to as ingress traffic while traffic exiting at a port 210 is referred to as egress traffic. The ports 210 are preferably Ethernet-enabled media access control (MAC) interfaces enabled with Institute of Electrical and Electronics Engineers (IEEE) standard 802.3.

The PDUs of the ingress flow are conveyed between the plurality of ports 110 and ingress switch controller 230 via one or more internal data buses 220. The ingress switch controller 230 of the preferred embodiment generally includes a classifier and a forwarding processor. The classifier: parses ingress PDUs; extracts one or more fields from the PDUs including source or destination addresses, or both, protocol types, and priority information; and maps the PDUs to one of a set of flow categories based upon class of service (CoS) and or quality of service (QoS) policies, or both. The forwarding processor in some embodiments then prepares the PDUs of each flow for transmission, which may include identifying the appropriate egress port from which to transmit the PDU, identifying the next-hop physical address of an adjacent device to which the frame is to be forwarded, appending one or more VLAN tags, and encapsulating the PDU in a new Data Link Layer header. The PDUs of the ingress flow are then transmitted by the ingress switch controller 230 to the switch fabric 250.

In addition to the switch controller 230 for ingress processing, the switching device 200 further includes an egress HFM 240 for processing egress traffic. The egress HFM 240 in the preferred embodiment receives PDUs from the switch fabric 250 via an input channel 234, performs various forms of hierarchical processing and hierarchical gating as a function of the flow and system resources, and buffers the PDUs immediately prior to transmission to the designated egress port among the plurality of ports 210 via the output channel 236. As discussed in greater detail below, the HFM 240 obviates the need for a scheduler and complex hierarchical queuing employed in previous systems while substantially reducing the demands on computational resources required to perform egress processing.

Figure 3:
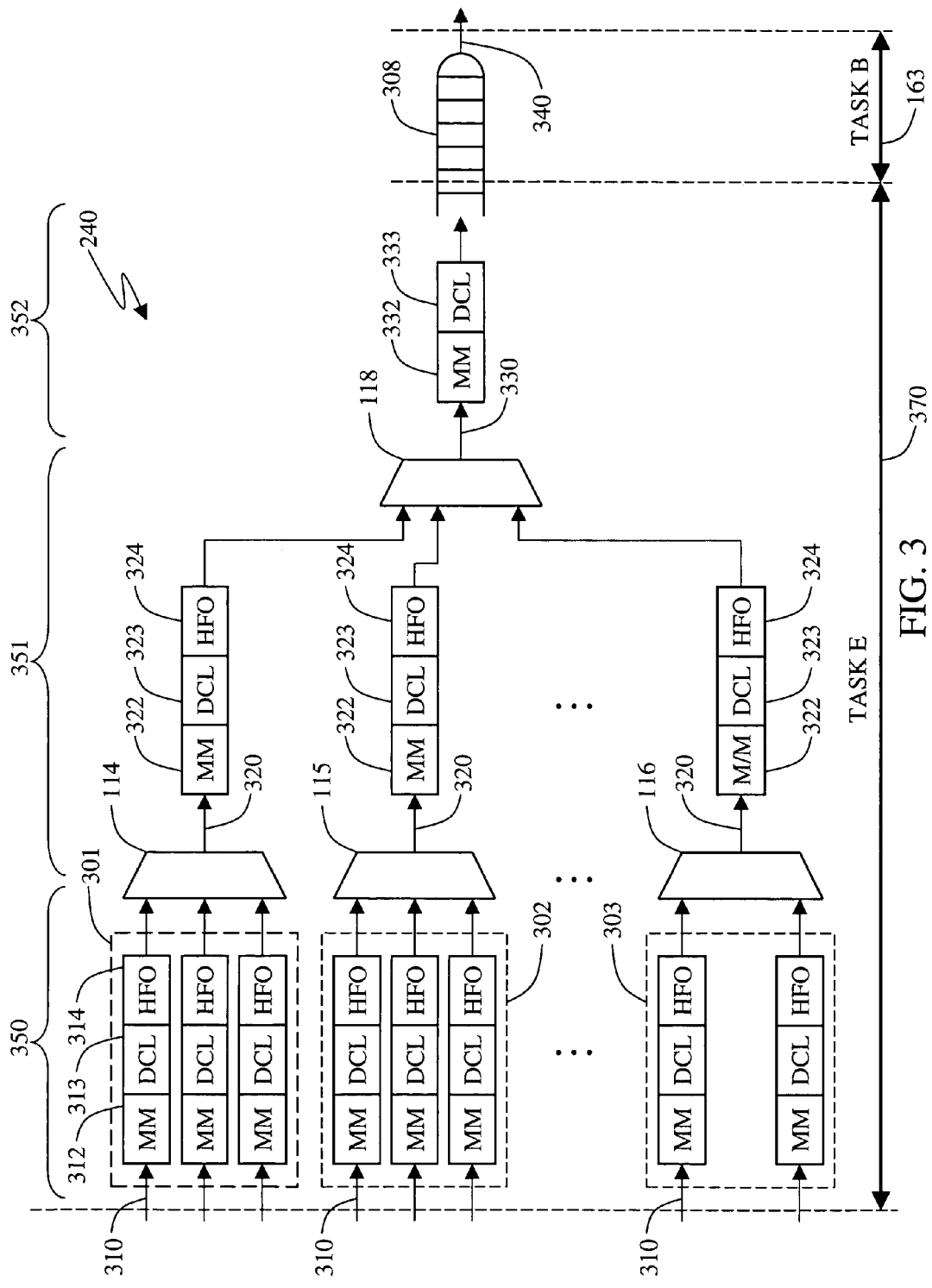
FIG. 3 is a functional block diagram of the hierarchical, flow-characterizing multiplexor for mapping a plurality of flows at the input into a single output, according to the preferred embodiment.

Illustrated in FIG. 3 is a functional block diagram of the hierarchical, flow-characterizing multiplexor 240 for mapping a plurality of flows 310 at the input into a single flow at the output 340 with minimal demands on processing and memory resources. The PDUs of the flows generally undergo processing at each of the plurality of hierarchical levels before being enqueued at an egress queue 308. In the preferred embodiment, there are three hierarchical levels, across task E 370, coinciding with the regions defined by brackets 350-352. At each level 350-352, the PDUs of the flows may undergo processing used to condition the PDU for egress from the switching device 200 and or to regulate the flow in accordance with some flow parameters, the most notable of which is bandwidth.

In the preferred embodiment, each of the plurality of flows 310 at the first hierarchical level 350 is mapped into flow at the second hierarchical level 351 which is, in turn, mapped to the third hierarchical level 352. Each downstream flow generally represents the confluence of one or more upstream flows. In a Multiprotocol Label Switching (MPLS) environment, for example, the plurality of flows 310 at the first level may be associated with inner tunnels that map into a plurality of outer tunnels represent by the downstream flows 320 at the second hierarchical level 351. The PDUs associated with the virtual paths are subsequently mapped into a single flow 330 that is direct to a final stage queue 308 prior to transmission from the HFM 240 output.

At each hierarchical level 350-352, the flows are generally subjected to a one or more egress processing routines. In the preferred embodiment, the processing routines fall into two course categories, namely hierarchical forwarding operations and gating operations. Hierarchical Forwarding Operations (HFO) broadly include one or more procedures necessary to prepare each PDU for the next process in the hierarchy. The cumulative affect of the hierarchical PDU forwarding processes prepare the PDU for transmission to the next post-HFM downstream entity, which may take the form of an egress port, a switch fabric, a network node, or a software routing, for example. The PDU forwarding operations may encompass any number of processes and are highly dependent on the particular type of switch and its implementation. In an MPLS environment, for example, each of the forwarding operations at one hierarchical level may involve the identification and insertion of an inner label while forwarding operations at the next level may involve the identification and insertion of an outer label. One skilled in the art will recognize that any number of other forwarding operations may be employed at one or more hierarchical levels and that this invention is not restricted to MPLS.

Gating operations generally include one or more decision-making operations used to regulate or otherwise conform the flow in accordance with a system parameter defined by the network administrator or by the inherent limitations of the switching device 200, for example. In the preferred embodiment, the gating operation includes bandwidth gating used to prevent a flow from exceeding a given number of bytes per unit of time. In an MPLS switching context, for example, a network service provider may limit a customer to a predefined flow rate specified in a service level agreement in order to prevent the customer from impacting the traffic of other customers. To enforce the service level agreement, the switching device 200 may drop PDUs of an inner tunnel 310 at the first hierarchical level 350, drop PDUs of an outer tunnel 320 at the second hierarchical level 351, and or drop PDUs at the third hierarchical level 352 to limit the rate of transmission from the egress port.

Two representative bandwidth gating operations that are particularly well suited for the preferred embodiment include the single rate Three Color Marking (srTCM) algorithm and the two rate Three Color Marking (trTCM) algorithm. The first, srTCM, is defined in Internet Engineering Task Force (IETF) Request for Comment (RFC) 2697, and trTCM defined in IETF RFC 2698. Either TCM algorithm described in these standards may be used alone or in combination to augment other decision-making processes in the switch responsible for determining if and when to discard packets. To implement the srTCM algorithm, for example, the HFM 240 employs a plurality of measure/mark modules (MM) 312 to measure how much data is flowing per given time period and, based on that measurement, classify the packet into one of three categories referred to by those skilled in the art as "colors," namely green, yellow, and red. The color associated with a PDU is determined as a function of traffic parameters defined for each flows. The traffic parameters in srTCM include a committed information rate (CIR) and two associated burst sizes, namely a committed burst size (CBS) and an excess burst size (EBS).

In general, a MM 312, 322, 332 evaluates the flow in accordance with srTCM to determine which mark to apply. If the PDU does not exceed the CBS, a green marker is applied to indicate that the PDU should be delivered unless, for example, a port is down. A PDU that is part of a flow that exceeds both the CIR and EBS is marked red and immediately discarded. If the PDU exceeds the CBS but not the EBS, a yellow marker is associated with the PDU to signify that the PDU may be delivered as long as there is system resources or queuing resources to do so. Although a yellow PDU may be discarded depending on the availability of system resources, it must always be dropped before a green PDU is dropped. The PDU may be marked using a protocol-specific field or a non-protocol marking when not supported by the protocol.

In the preferred embodiment, a plurality of discard control logic (DCL) units 313, 323, 333 are used downstream of an associated MM to selectively drop PDUs as needed. For example, each DCL 313 at the first hierarchical level 350 is adapted to inspect the mark on each PDU, or PDU descriptor, of the associated flow 310 and serve as a gatekeeper by either dropping or passing the PDU. As described above, generally all green PDUs and potentially one or more yellow PDUs are passed to one or more HFO 313, each HFO 313 being defined as a function of the specific flow and level. The green and yellow packets of the first level 350 flows passed by the DCL 313 are then mapped by multiplexors 114, 115, 116 into a plurality of secondary flows at the second hierarchical level 351. The mapping represented by the multiplexors 114, 115, 116 may be implemented using linked lists or other system of pointers, for example.

In the preferred embodiment, the PDUs of the flows 320 at the second level 351 are subjected to additional gating and forwarding operations. In particular, an MM 322 operating in a color-blind mode applies a color to the PDUs of the flows 320 based upon traffic parameters specific to those second level 351 flows 320. In some embodiments, one or more MM 322 may be configured to operate in a color-aware mode in which the color applied by a preceding entity is left undisturbed. The PDUs are tagged with green, yellow, or red markers depending on the CIR, CBS, and EBS associated with the flow 320. As described above, red packets are immediately dropped while yellow packets are passed or discarded depending on resource availability at the switching device 200. Discard of one or more yellow PDUs may be necessary to the extent that system resources are insufficient to support burst traffic in excess of the CIR but less than CBS for a flow 320 prescribed by the customer's service level agreement. The green and yellow PDUs not discarded are then processed in accordance with HFO 324.

The plurality of flows from the second hierarchical level 351 are then mapped by multiplexor 118 into a single flow 330 at the third hierarchical level 352. In the preferred embodiment, the third level flow 330 is subjected to additional gating at DCL 333, which may be employed to regulate the output flow of PDUs currently buffered by the queue 308 and minimize the probability of green packets being lost due to tail drop, for example. The output 340 of queue 308 may then be transmitted to an egress port or other processing entity.

Figure 4:
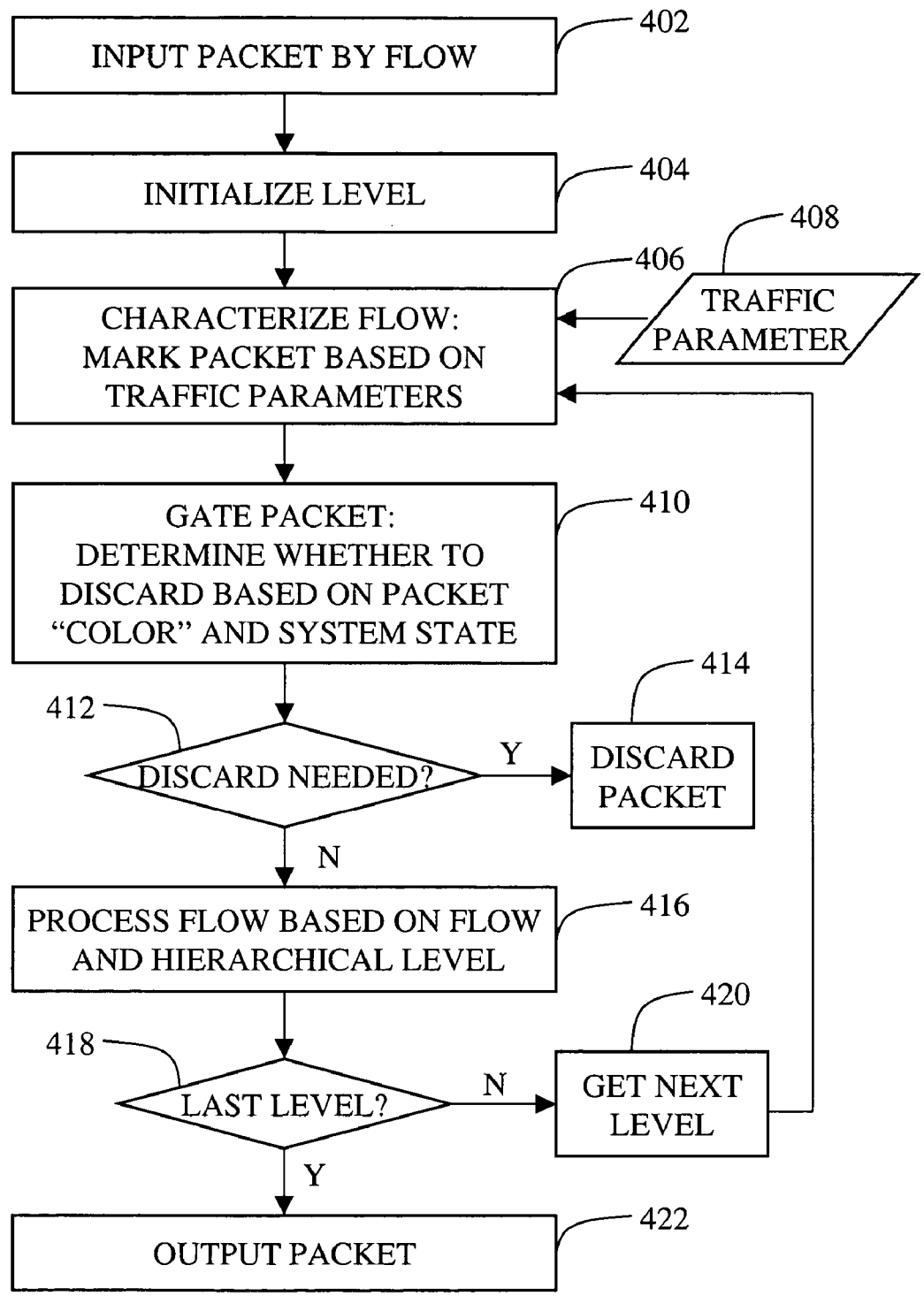
FIG. 4 is a flowchart of the method for processing a packet with hierarchical gating, according to the preferred embodiment.
Figure 5:
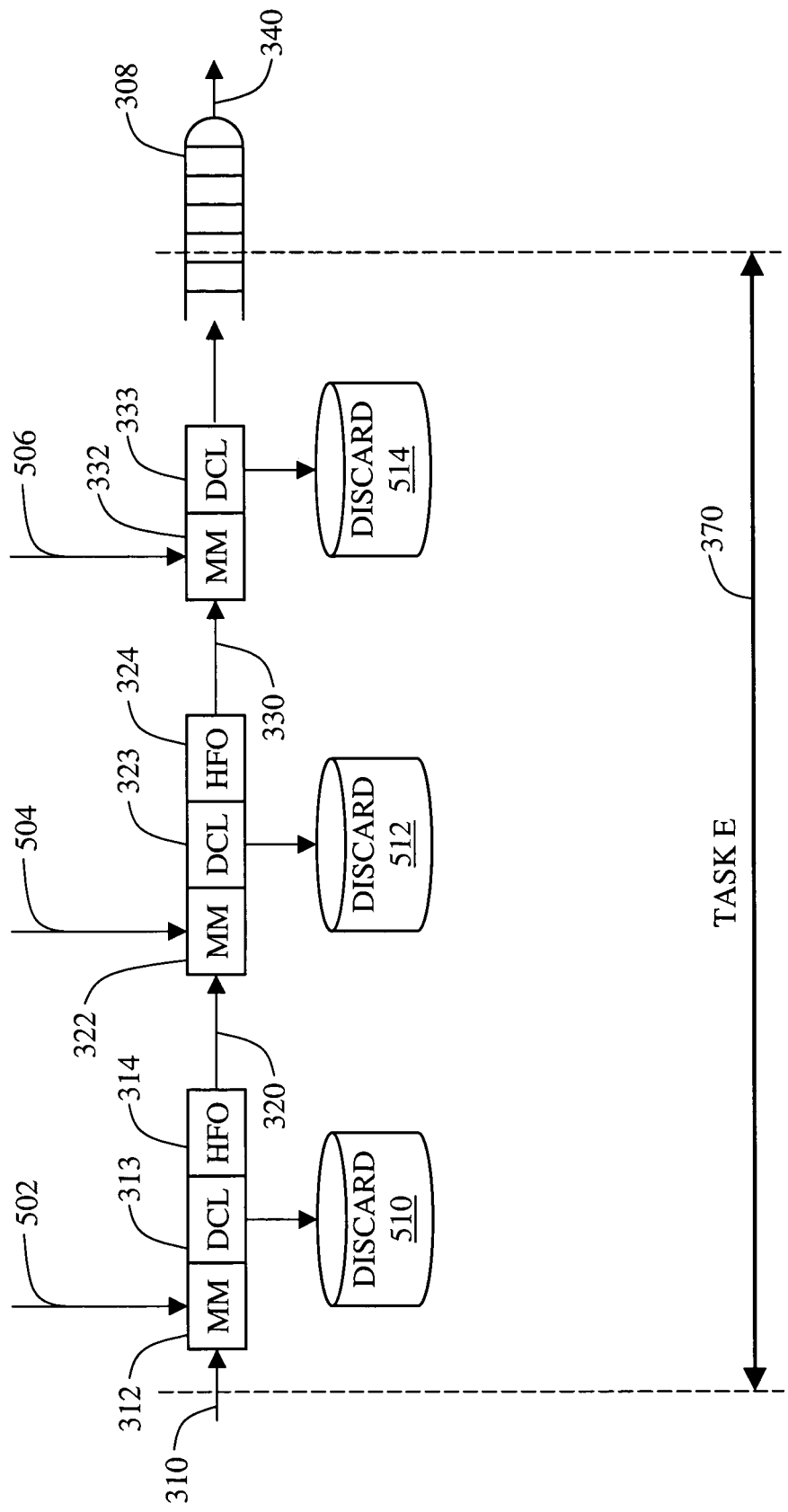
FIG. 5 is a diagram of a sequence of processes to which a packet is subject when propagating through the hierarchical, flow-characterizing multiplexor, according to the preferred embodiment.

Illustrated in FIG. 4 is a flowchart of the method for processing an egress packet using hierarchical gating. Illustrated in FIG. 5 is a diagram of a sequence of processes to which a packet is subject when propagating through the HFM 240. Referring to FIG. 4 and FIG. 5 together, the HFM 240 receives (step 402) the input flow 310 previously classified by an upstream process such as a switch controller. Upon receipt, the packet is subjected to processing in accordance with the first hierarchical level of a plurality of hierarchical levels. At the first hierarchical level 350 determined by a level initialization (step 404), the HFM 240 characterizes (step 406) the flow associated with the PDU in order to qualitatively assess the flow and the need for subsequent gating. If the srTCM algorithm is employed, the flow is characterized in accordance with the CIR, CBS, and EBS traffic parameters 502 provided (step 408) by the switch controller 200 via the flow control 232. Depending on traffic rate for the particular flow at the current hierarchical level, the packet is categorized into one of the three colors at the MM 312 by marking the packet, or an associated packet descriptor, with the applicable color.

After the PDU is marked, the packet is subjected to gating (step 410). In particular, the DCL 313 associated with the current hierarchical level is applied. If the PDU is colored red, the discard testing (step 412) is answered in the affirmative and the packet immediately discarded (414), preferably by transmitting the packet or its descriptor to a discard queue

510. A packet colored yellow may also be discarded by DCL 313 depending on system state variables indicating the level of congestion, for example. If not dropped, the discard testing (step 412) is answered in the negative and the packet passed. In some embodiments, the packet is subjected to one or more hierarchical forwarding operations 314 (step 416). The HFOs are generally specific to the flow and to the hierarchical level. Forwarding operations may include, for example, MPLS label addressing, VLAN header encapsulation referred to by those skilled in the art as VLAN stacking, or multi-layer encapsulation associated with a protocol stack. To implement an egress protocol stack, for example, flows at the transport level comprising transport control protocol (TCP) and User Datagram Protocol (UDP) segments may be mapped initially into IP protocol at the first hierarchical level, followed by a second hierarchical layer for multiple network level protocol processing such as IP, Internetwork Packet exchange (IPX), or Systems Network Architecture (SNA) encapsulation.

The packet then maps or otherwise proceeds to the next hierarchical level of processing. Unless the current hierarchical level is the last level, the last level testing (step 418) is answered in the negative and the current level advanced upon retrieval of the next level (step 420). In the process of getting the next level (step 420), the HFM 240 generally retrieves level-specific control information including MPLS address and path information or the packet's srTCM parameters, for example. At the second hierarchical level 351, the second flow 320, which represents the confluence of a plurality of logically related first level flows, is characterized based upon new traffic parameters 504 (step 408). In the case of srTCM, the second level traffic parameters 504 include CIR, CBS, and EBS values transmitted to the HFM 240 via flow control 232. The MM 322 then marks (step 406) the packet in accordance with the characterization, the DCL 323 transmits or discards (step 410) the packet as a function of the mark, and one or more hierarchical forwarding operations 324 further prepare (step 416) the packet for the next downstream process.

The packet process described above is repeated for any subsequent hierarchical levels until the last hierarchical level, e.g. third hierarchical level 352, is reached. In the preferred embodiment, the packet is subjected to a final MM 332 using traffic parameters 506 and, if not discarded by DCL 333, is subsequently buffered at the output queue 308. An enqueue function commits the packet to the output queue 308 where it remains until a separate dequeue function, signified by task B 163, transmits the packet 340 from an egress port 210, into a switch fabric, or other processing entity. Packets subsequent received by the HFM 240 may be processed from input 310 to final the queuing 308 in the manner described above.

One skilled in the art will appreciate that in the absence of hierarchical queues or scheduling delays, the packet processing can be perform packet sequentially from one hierarchical level to the next without delay, intervention, or interruption. As such, all levels may be continuously processed in a single task E 370 from the point where the packet is received by the HFM 240 to the point of the final queue 308. This is in sharp contrast to other approaches in the art where the enqueue and dequeue functions associated with a myriad of queues cause hierarchical forwarding processes to be performed in a piecemeal fashion while consuming substantial computational resources.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

I claim:

1. A hierarchical multiplexing method comprising the steps of:
   receiving a protocol data unit (PDU) associated with one of a plurality of flows;
   sequentially processing the PDU at each of a plurality of hierarchical levels, said processing at each of the plurality of hierarchical levels consisting of: characterizing the flow at a current hierarchical level;
   gating the PDU wherein the PDU is either passed or dropped based upon the character of the flow at the current level, wherein the gating includes applying a color to the PDUs of the flows based upon traffic parameters specific to those flows at a second hierarchical level characterizing the flow at the current hierarchical level;
   additionally gating the PDU based upon the character of the flow at the second hierarchical level, wherein the additional gating includes employing a plurality of measure/mark modules to measure how much data is flowing per given time period; and
   outputting the gated PDU and the additionally gated PDU in a single stream via a hierarchical multiplexor if the PDU is passed at each of the plurality of hierarchical levels.

2. The hierarchical multiplexing method of claim 1, wherein the plurality of hierarchical levels comprises a last hierarchical level, wherein the step of sequentially processing the PDU at the last hierarchical level comprises the step of queuing the PDU.

3. The hierarchical multiplexing method of claim 2, wherein the step of queuing the PDU comprises the step of buffering the PDU at an egress queue associated with an egress port of a network switching device.

4. The hierarchical multiplexing method of claim 2, wherein the step of queuing the PDU comprises the step of buffering the PDU preceding transmission to a switch fabric.

5. The hierarchical multiplexing method of claim 1, wherein the step of sequentially processing the PDU at one or more hierarchical levels comprises performing one or more forwarding operations.

6. The hierarchical multiplexing method of claim 5, wherein the one or more forwarding operations comprise appending an address to the PDU.

7. The hierarchical multiplexing method of claim 6, wherein the appending of an address to the PDU comprises the steps of: appending a virtual circuit identifier at a first hierarchical level; and appending a virtual path identifier at a second hierarchical level.

8. The hierarchical multiplexing method of claim 5, wherein the one or more forwarding operations comprises appending one or more virtual local area network (VLAN) tags at one or more hierarchical levels.

9. The hierarchical multiplexing method of claim 1, wherein: characterizing comprises the step of measuring a flow rate for the flow associated with the PDU based on a current hierarchical level; and gating comprises the step of discarding the PDU if it exceeds a maximum bandwidth parameter.

10. The hierarchical multiplexing method of claim 1, wherein the gating comprises the steps of: associating with the PDU a color marker using a three color marker algorithm; and applying discard control logic to selectively discard the PDU based upon the color marker.

11. A hierarchical multiplexing method comprising the steps of:
receiving a protocol data unit (PDU) associated with one of a plurality of flows;
sequentially processing the PDU at each of three or more hierarchical levels, said processing at each of the hierarchical levels comprising the step of gating the PDU characterizing the flow at a current hierarchical level;
additionally gating the PDU based upon the character of the flow at the second hierarchical level, wherein the additional gating includes employing a plurality of measure/mark modules to measure how much data is flowing per given time period;
mapping the a plurality of flows between each of the hierarchical levels;
applying a color to the PDUs of the flows based upon traffic parameters specific to those flows at a second hierarchical level; and
outputting the gated PDU and the additionally gated PDU in a single stream via the hierarchical multiplexor if the PDU is passed at each of the plurality of hierarchical levels.

12. A packet processing method comprising the steps of:
receiving a protocol data unit (PDU) associated with one of a plurality of flows;
sequentially processing the PDU at each of a plurality of hierarchical levels, said processing at each of the plurality of hierarchical levels consisting of:
characterizing the flow at a current hierarchical level;
gating the PDU based upon the character of the flow at the current hierarchical level, wherein the gating includes applying a color to the PDUs of the flows based upon traffic parameters specific to those flows at a second hierarchical level;
additionally gating the PDU based upon the character of the flow at the second hierarchical level, wherein the additional gating includes employing a plurality of measure/mark modules to measure how much data is flowing per given time period; and
outputting the gated PDU and the additionally gated PDU in a single stream via a hierarchical multiplexor if the PDU is passed at each of the plurality of hierarchical levels.

13. A hierarchical multiplexor comprising:
an input channel for receiving a protocol data unit (PDU) associated with one of a plurality of flows;
a plurality of hierarchical levels, each hierarchical level consisting of:
means for characterizing the flow at the hierarchical level;
means for gating the PDU based upon the character of the flow at the hierarchical level, wherein the gating includes applying a color to the PDUs of the flows based upon traffic parameters specific to those flows at a second hierarchical level;
means for additionally gating the PDU based upon the character of the flow at the second hierarchical level, wherein the additional gating includes employing a plurality of measure/mark modules to measure how much data is flowing per given time period; and
means for mapping the PDU to a flow at the next hierarchical level; and
an output channel for transmitting the gated PDU and the additionally gated PDU in a single stream via the hierarchical multiplexor if the PDU is passed at each of the plurality of hierarchical levels.

14. The hierarchical multiplexor of claim 13, wherein one or more of the plurality of hierarchical levels further consists of means for performing forwarding operations associated with the PDU.

15. The hierarchical multiplexor of claim 14, wherein the hierarchical multiplexor further comprises a last hierarchical level comprising: means for characterizing the flow at the last hierarchical level; and means for gating the PDU based upon the character of the flow at the last hierarchical level.

16. The hierarchical multiplexor of claim 15, wherein the last hierarchical level further comprises a queue for buffering the PDU at the output channel.

17. The hierarchical multiplexor of claim 14, wherein the means for characterizing the flow comprises a meter for measuring the flow rate of the flow associated with the PDU.

18. The hierarchical multiplexor of claim 17, wherein the means for gating the PDU comprises means for discarding the PDU depending on the flow rate.

19. The hierarchical multiplexor of claim 17, wherein the means for characterizing the flow further comprises a marker module for marking the PDU in accordance with a Three-Color Marker (TCM) algorithm.

20. The hierarchical multiplexor of claim 19, wherein the means for gating the PDU comprises means for discarding the PDU in accordance with the TCM algorithm.

21. A hierarchical multiplexor for processing a protocol data unit (PDU) associated with one of a plurality of flows, the hierarchical multiplexor comprising:
a plurality of hierarchical levels for performing gating operations, each hierarchical level consisting of:
a meter for measuring the flow rate at the hierarchical level;
a gate for discarding the PDU based upon the flow rate at the hierarchical level wherein the gate applies a color to the PDUs of the flows based upon traffic parameters specific to those flows at a second hierarchical level;
an additional gate for discarding the PDU based upon the flow rate at the hierarchical level, wherein the additional gate includes a plurality of measure/mark modules to measure how much data is flowing per given time period; and
a last hierarchical level comprising a queue for buffering the gated PDU and the additionally gated PDU in a single stream via a hierarchical multiplexor prior to transmission.

* * * * *

UNITED STATES PATENT AND TRADEMARK OFFICE
CERTIFICATE OF CORRECTION

PATENT NO.         : 7,621,162 B2
APPLICATION NO.    : 10/750120
DATED              : November 24, 2009
INVENTOR(S)        : Alan Keith Bartky It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1192 days.

Signed and Sealed this

Fourteenth Day of December, 2010

David J. Kappos
*Director of the United States Patent and Trademark Office*